United States Patent [19]
Yamada

[11] Patent Number: 5,802,019
[45] Date of Patent: Sep. 1, 1998

[54] ACCESS CONTROL SYSTEM FOR OPTICAL DISK DEVICE

[75] Inventor: Minoru Yamada, Tokyo, Japan

[73] Assignee: NEC Corporation, Tokyo, Japan

[21] Appl. No.: 899,822

[22] Filed: Jul. 24, 1997

[51] Int. Cl.$^6$ .................................................. G11B 17/22
[52] U.S. Cl. ........................ 369/32; 369/44.11; 369/44.32
[58] Field of Search ............................. 369/32, 44.28, 369/44.11, 44.32, 44.26

[56] References Cited

U.S. PATENT DOCUMENTS

| | | | |
|---|---|---|---|
| 5,339,299 | 8/1994 | Kagami et al. | 369/32 |
| 5,398,221 | 3/1995 | Ogawa | 369/32 |
| 5,497,360 | 3/1996 | Takahara et al. | 369/22.28 |

*Primary Examiner*—Tod R. Swann
*Assistant Examiner*—Kim-Kwok Chu
*Attorney, Agent, or Firm*—Sughrue, Mion, Zinn, Macpeak & Seas, PLLC

[57] ABSTRACT

Disclosed is an access control system for an optical disk device, which has: a residual track number counter circuit which counts the number of residual tracks from a current position of an optical pickup to a target position; an optical pickup velocity calculation circuit which calculates a current velocity of the optical pickup at intervals of a predetermined time period; and a control circuit which comprises a reference velocity calculation means which a reference velocity from the number of residual tracks to be counted by the residual track number counter circuit, a velocity error calculation means which calculates a velocity error between the reference velocity and the current velocity, a current acceleration calculation means which calculates a current acceleration based on a variation of the current velocity and an acceleration error calculation means which calculates an acceleration error between the current acceleration and a predetermined reference acceleration; wherein the control circuit further comprises a control means which moves the optical pickup to the target position while controlling the velocity of the optical pickup by using the velocity error or using a value obtained by adding a correction value determined by the velocity error, the current acceleration and the acceleration error to the velocity error as a driving signal of the optical pickup.

4 Claims, 10 Drawing Sheets

ACCESS CONTROL SYSTEM FOR OPTICAL DISK DEVICE

FIELD OF THE INVENTION

This invention relates to an access control system for an optical disk device, and more particularly to, an access control system for an optical disk device for controlling the velocity of an optical pickup up to a target track position.

BACKGROUND OF THE INVENTION

Optical disk devices generally employ a method of seeking where the velocity of the optical head is controlled based on a velocity error (velocity difference) between a target velocity profile and a current velocity. In this case, even when an optimum target velocity profile is originally set, the optical head may not move along the target profile and may eventually stop missing a target position, due to a dispersion or a variation with time in mechanical parts.

Because of this, some access control systems have been used to provide a stable and high-speed movement control for an optical disk device. For example, such an access control system for an optical disk device is disclosed in Japanese patent application laid-open Nos.5-12692(1993), 5-135376(1993) and 7-192278(1995).

Figure 1:
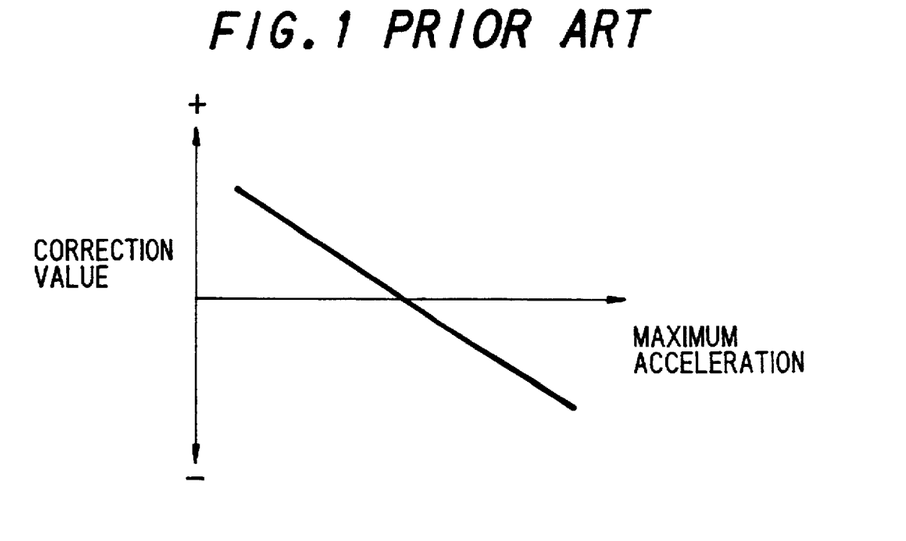
FIG. 1 is a diagram for showing the relation between a maximum acceleration and a correction value during the movement of optical pickup in the conventional access control system(Japanese patent application laid-open 5-12692(1993), FIG. 2 is a diagram for showing velocity control periods during the movement of optical pickup in the conventional access control system(Japanese patent application laid-open 5-12692(1993), FIG. 3 is a diagram for showing the relation between a maximum velocity and a correction value during the movement of optical pickup in the conventional access control system(Japanese patent application laid-open 5-12692 (1993), FIG. 4 is a diagram for showing the correction timing of a velocity during the movement of optical pickup in the conventional access control system(Japanese patent application laid-open 5-12692(1993), FIG. 5 is a diagram for showing a velocity control during the movement of optical pickup in the conventional access control system(Japanese patent application laid-open 5-135376(1993), FIG. 6 is a diagram for showing the correction timing of a velocity during the movement of optical pickup in the conventional access control system(Japanese patent application laid-open 7-192278(1995), FIG. 7 is a block diagram showing main part of an access control system in a preferred embodiment according to the invention, FIG. 8 is a block diagram showing an optical disk device including an access control system in the preferred embodiment according to the invention, FIG. 9 is a diagram for showing an example of velocity control in the optical disk device in FIG. 6, FIG. 10 is a diagram for showing the relation between a velocity error and a correction value used in the velocity control of the optical disk device in FIG. 8, FIG. 11 is an illustration for showing the assigning conditions of the sign of a correction value to be added used in the velocity control of the optical disk device in FIG. 8, and FIGS. 12 and 13 are flow charts for showing an example of a velocity control operation during the deceleration motion of a control circuit of the access control system in the embodiment.
Figure 2:
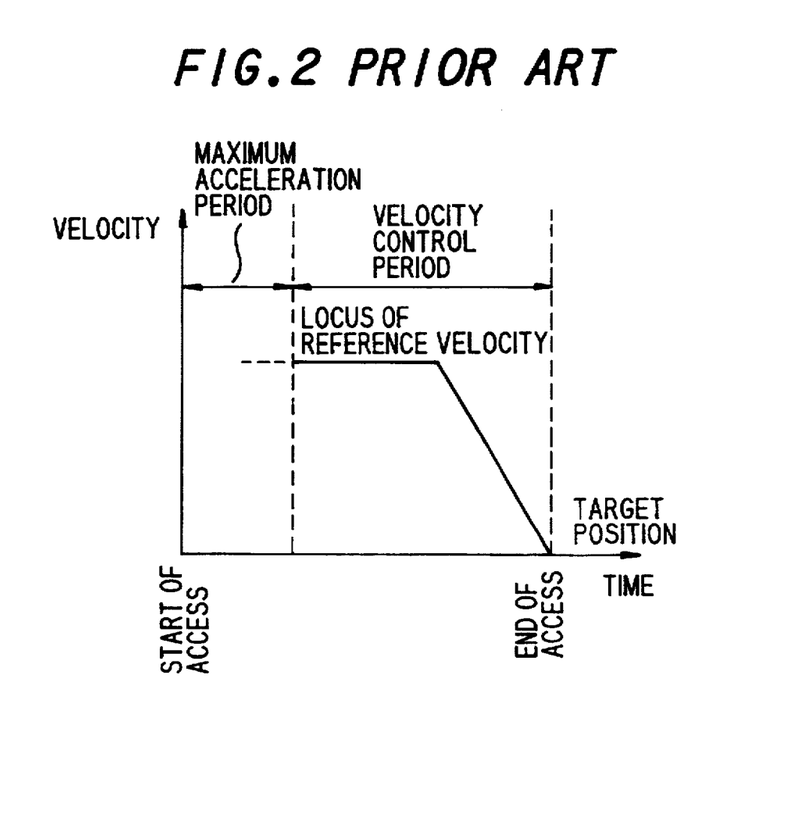

The control operation of a first embodiment disclosed in Japanese patent application laid-open No.5-12692(1993) is shown in FIGS. 1 and 2. FIG. 1 is a graph for the calculation of correction value in operation, which shows the relation between a current maximum acceleration of optical pickup and a correction value to be added to a reference velocity control signal. FIG. 2 is a graph showing velocity control periods and a locus of reference velocity.

As shown in FIG. 2, during a maximum acceleration period begun from start of access, a current acceleration is calculated by measuring the time required to reach a predetermined velocity from the stationary state of the optical pickup. Furthermore, a correction value to be added to the velocity control signal is determined according to the obtained acceleration and the relation in FIG. 1. Then, the velocity control is performed while adding the correction value to the velocity control signal for the locus of reference velocity.

Figure 3:
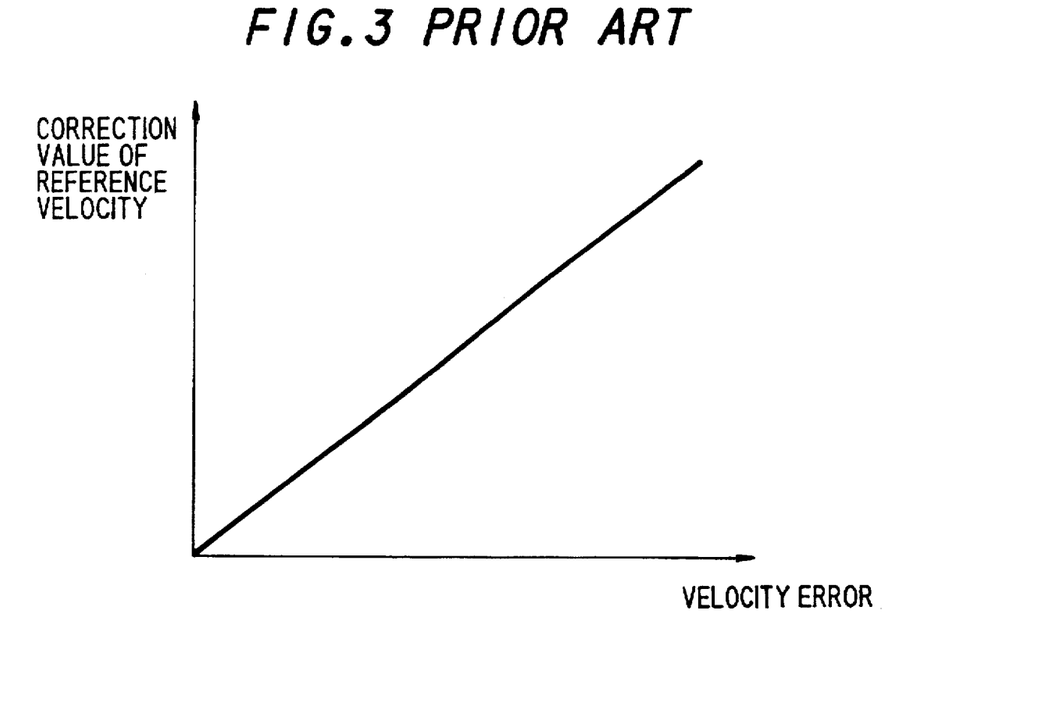
Figure 4:
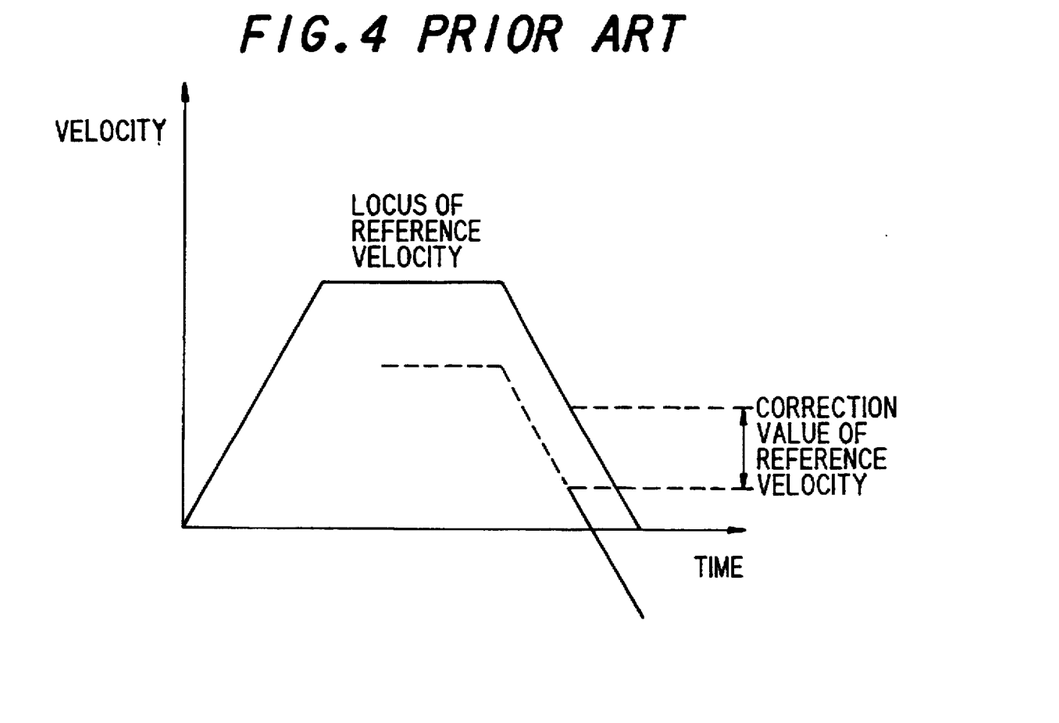

The control operation of a second embodiment disclosed in Japanese patent application laid-open No.5-12692(1993) is shown in FIGS. 3 and 4. FIG. 3 is a graph for the calculation of correction value in operation, which shows the relation between a current velocity error of optical pickup to be calculated based on measurement and a correction value to be added to a reference velocity control signal. FIG. 4 is a graph showing a correction timing of reference velocity.

As shown in FIG. 4, when the optical pickup reaches a predetermined position with the velocity controlled along a locus of reference velocity, a correction value to be added to the velocity control signal is determined according to the relation between an error (difference) between the locus of reference velocity and a current velocity and the relation in FIG. 3. Then, the velocity control is performed while adding the correction value to the velocity control signal for the locus of reference velocity.

Figure 5:
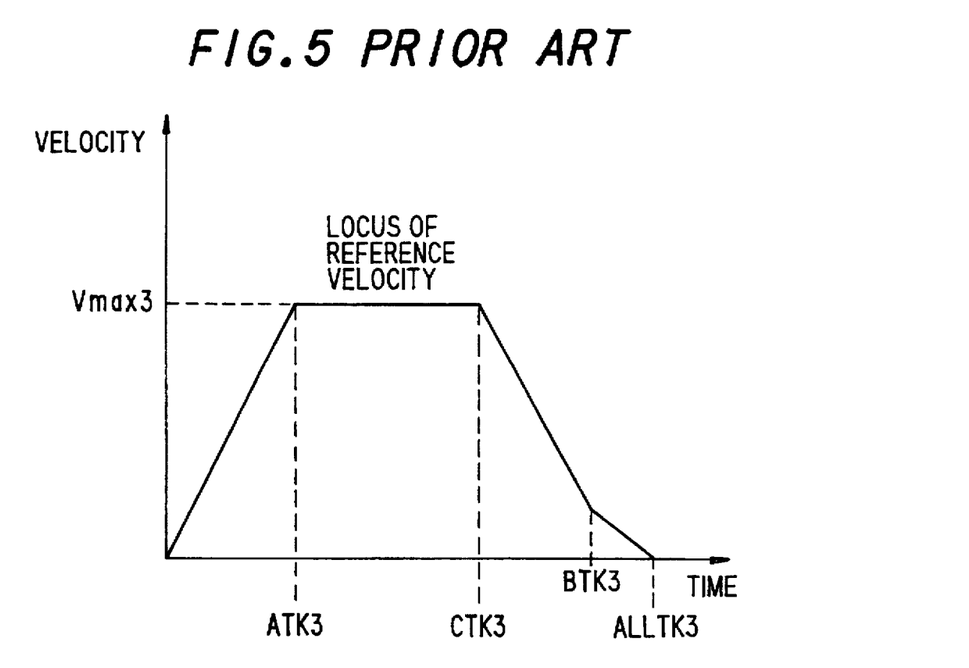

The control operation of an embodiment disclosed in Japanese patent application laid-open No. 5-135376(1993) is shown in FIG. 5.

As shown in FIG. 5, the velocity control is performed switching loci of reference velocity during deceleration at a position BTK3. The switching condition is to reach a predetermined number of residual tracks or that the velocity locus output between CTK3 and BTK3 is less than a maximum value of the velocity locus between BTK3 and ATK3.

Figure 6:
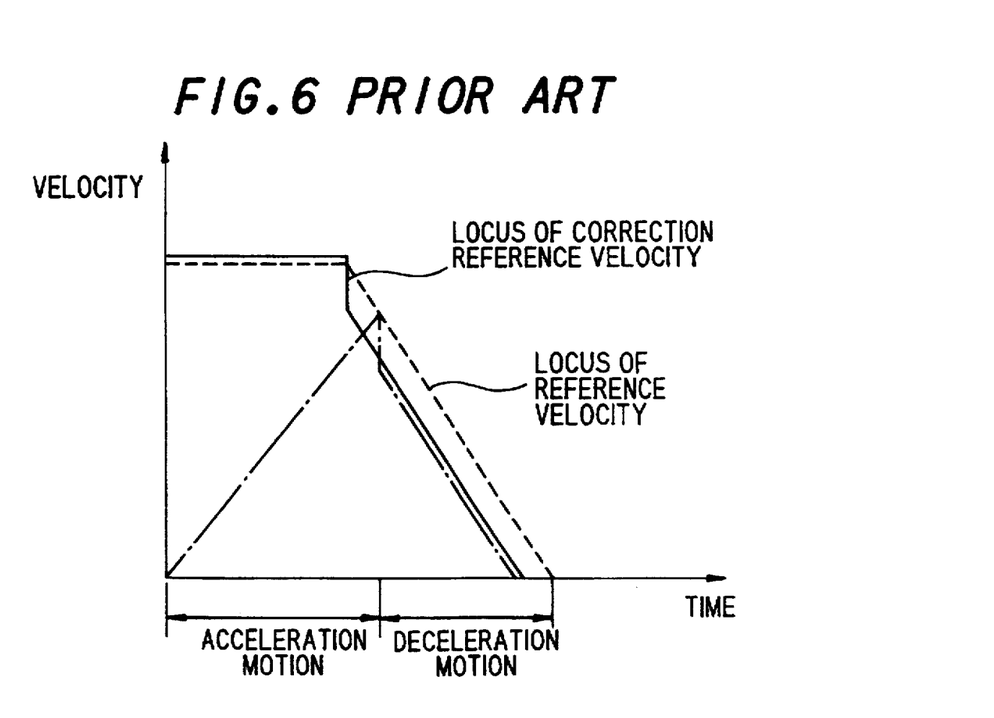

The control operation of an embodiment disclosed in Japanese patent application laid-open No.7-192278(1995) is shown in FIG. 6.

As shown in FIG. 6, during the acceleration motion, a locus of reference velocity as designed values is made to be its target value. When a current velocity(indicated by a dotted chain line) reaches the locus of reference velocity, the reference velocity is switched to shift to the deceleration motion and a locus of correction reference velocity is made to be its target value. Alternatively, during the acceleration motion, the velocity control is performed by using a correction reference velocity corresponding to the number of residual tracks for control which is set increasing the number of residual tracks by a predetermined number of tracks. In this case, during the deceleration motion, a correction reference velocity corresponding to a real number of residual tracks is used.

However, in the conventional access control systems, the correction value cannot be changed after it is preset.

Therefore, when a state that the deceleration motion cannot be corrected by the preset correction value happens, the velocity control cannot be effectively performed.

SUMMARY OF THE INVENTION

Accordingly, it is an object of the invention to provide an access control system for an optical disk device which a stable and high-speed access operation can be always performed even when a dispersion or a variation with time in the mechanical parts occurs.

According to the invention, an access control system for an optical disk device, comprises:

- a residual track number counter circuit which counts the number of residual tracks from a current position of an optical pickup to a target position;
- an optical pickup velocity calculation circuit which calculates a current velocity of the optical pickup at intervals of a predetermined time period; and
- a control circuit which comprises a reference velocity calculation means which a reference velocity from the number of residual tracks to be counted by the residual track number counter circuit, a velocity error calculation means which calculates a velocity error between the reference velocity and the current velocity, a current acceleration calculation means which calculates a current acceleration based on a variation of the current velocity and an acceleration error (difference) calculation means which calculates an acceleration error between the current acceleration and a predetermined reference acceleration;
- wherein the control circuit further comprises a control means which moves the optical pickup to the target position while controlling the velocity of the optical pickup by using the velocity error or using a value obtained by adding a correction value determined by the velocity error, the current acceleration and the acceleration error to the velocity error as a driving signal of the optical pickup.

BRIEF DESCRIPTION OF THE DRAWINGS

The invention will be explained in more detail in conjunction with the appended drawings, wherein.

DESCRIPTION OF THE PREFERRED EMBODIMENTS

An access control system for optical disk device in the preferred embodiment of the invention will be explained in FIGS. 7 and 8.

Figure 8:
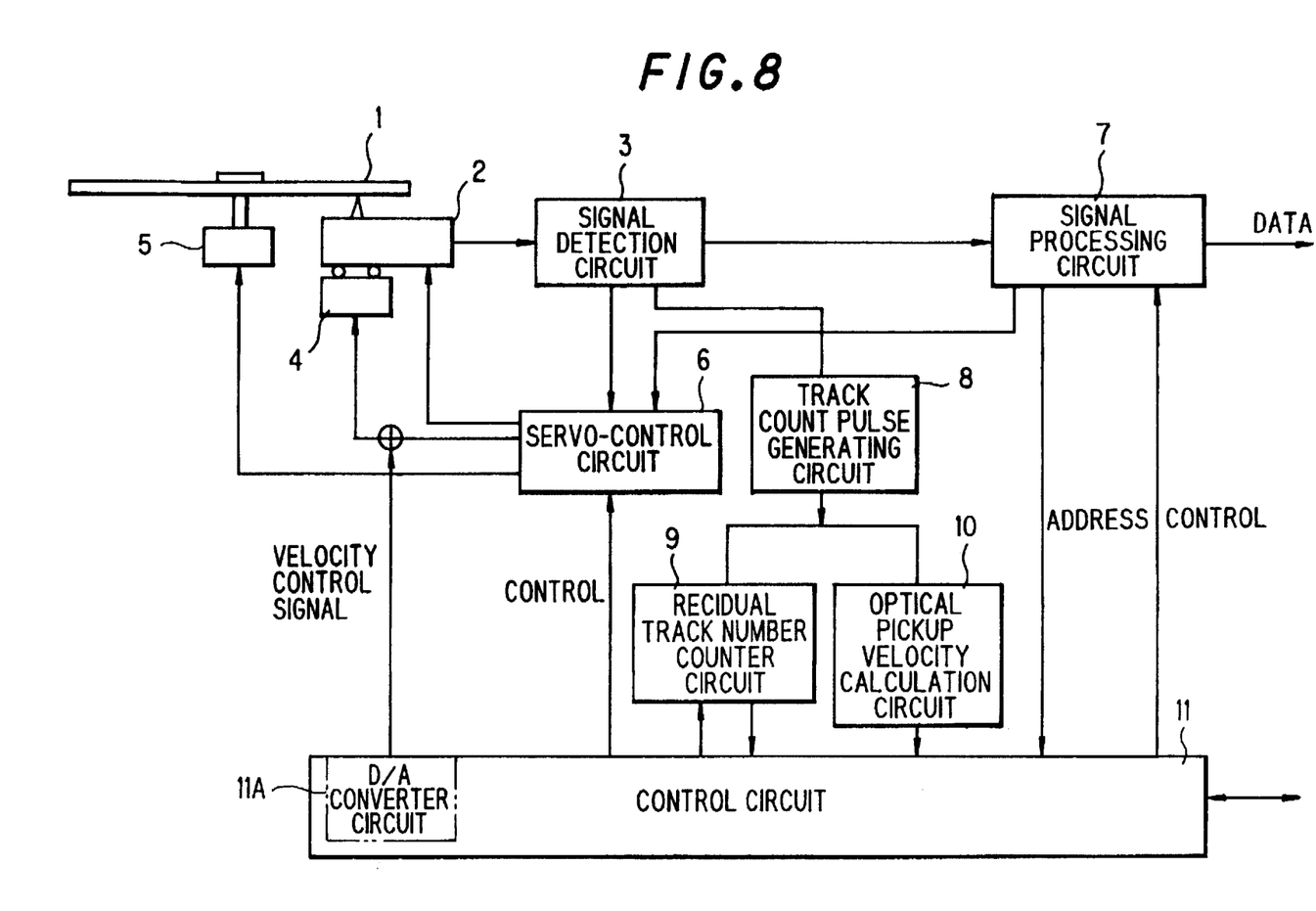

In FIG. 8, 1 is an optical disk, 2 is an optical pickup for reproducing information recorded on the optical disk 1. The information detected by the optical pickup 2 is sent to a signal detection circuit 3. The signal detection circuit 3 generates a RF signal, servo signals etc. 4 is a sled motor for moving the optical pickup 2 in the radial direction of the optical disk 1, and 5 is a spindle motor for rotating the optical disk 1. 6 is a servo-control circuit. The servo-control circuit 6 is actuated by a control circuit 11 explained later and servo-controls the optical disk 1 through the sled motor 4 and the spindle motor 5.

Also provided in this embodiment are a signal processing circuit 7 for producing a data signal, an address signal and a spindle PLL signal based on the RF signal from the signal detection circuit 3, a track count pulse generating circuit 8 for producing a track count pulse based on a tracking error signal from the signal detection circuit 3, and the control circuit 11 which controls the entire system including the servo-control circuit 6, the signal processing circuit 7 and an I/F(interface) circuit(not shown).

Between the control circuit 11 and the track count pulse generating circuit 8, there is provided a residual track number counter circuit 9 which counts the number of residual tracks up to a target position by the track count pulse generated by the track count pulse generating circuit 8 based on the information as to 'the number of tracks between the current position and the target position' received from control circuit 11. Also, parallel with the residual track number counter circuit, there is provided an optical pickup velocity calculation circuit 10 which calculates the current velocity of the pickup based on the frequency of the track count pulse or the number of pulses in a predetermined time period.

Detailing the above parts, the signal detection circuit 3 produces a RF signal, a focusing error signal and a tracking error signal from the output signal of the optical pickup 2.

The servo-control circuit 4 servo-controls the optical disk 1 by controlling a biaxial lens actuator and the sled motor of the optical pickup 2 based on the focusing error signal and the tracking error signal and controlling the spindle motor 5 based on the spindle PLL signal from the signal processing circuit 7. Also, it conducts sled-carrying and track-jumping in case of accessing.

Figure 7:
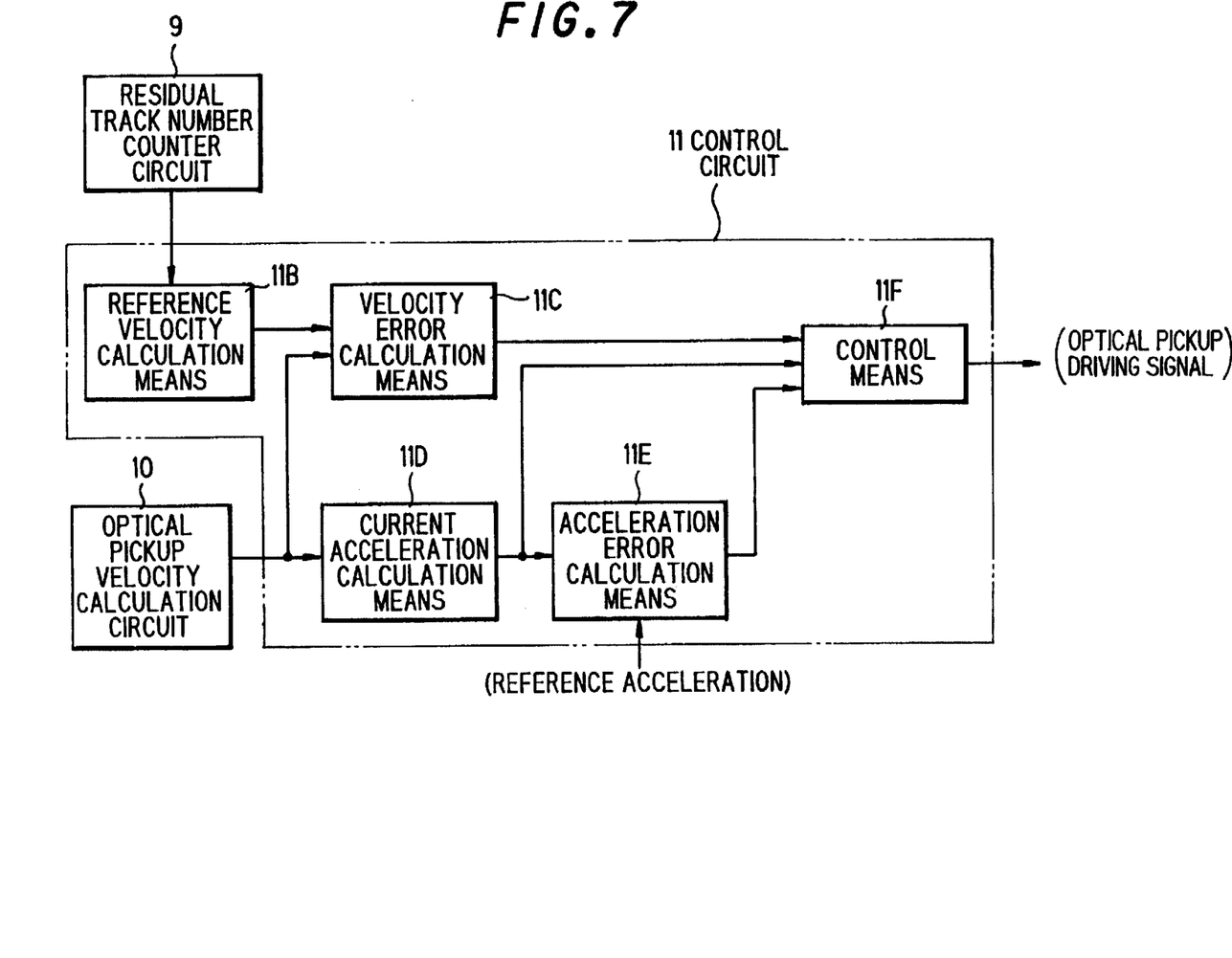

As shown in FIG. 7, the control circuit 11 comprises a reference velocity calculation means 11B which calculates the reference velocity of the optical pickup 2 from the number of residual tracks counted by the residual track number counter circuit 9, a velocity error (velocity difference) calculation means 11C which calculates a velocity error between the reference velocity and a current velocity of the optical pickup 2, a current acceleration calculation means 11D which calculates a current acceleration based on a variation of the current velocity, an acceleration error (acceleration difference) calculation means 11E which calculates an acceleration error between the calculated current acceleration and a preset reference acceleration, and a control means 11F which moves the optical pickup 2 up to a target position while controlling its velocity by using the velocity error as the driving signal of the optical pickup 2 or using the velocity error and a correction value to be added thereto which is determined by the velocity error, the current acceleration and the acceleration error.

In detail, the control circuit 11 gives the number of tracks from the current position of the optical pickup 2 to the target position to the residual track number counter circuit 9 before accessing, and then the residual track number counter circuit 9 reads the number of residual tracks up to the target position of the optical pickup 2 and calculates the reference velocity. The optical pickup velocity calculation circuit 10 reads the current velocity of the optical pickup 2. In the velocity control operation, the velocity error between the reference velocity and the current velocity is calculated, and then the correction value is added thereto and output from a D/A converter circuit 11A to move the optical pickup 2 to the target position. The D/A converter circuit 11A may be provided out of the system.

Figure 9:
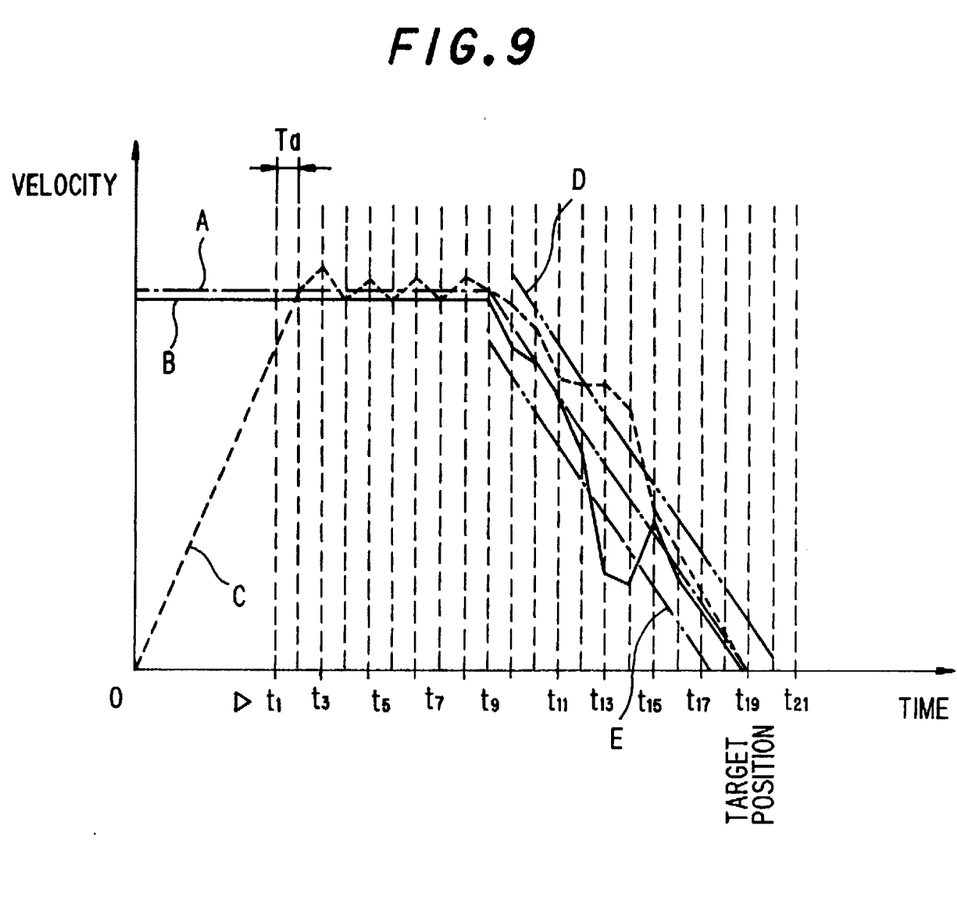
Figure 10:
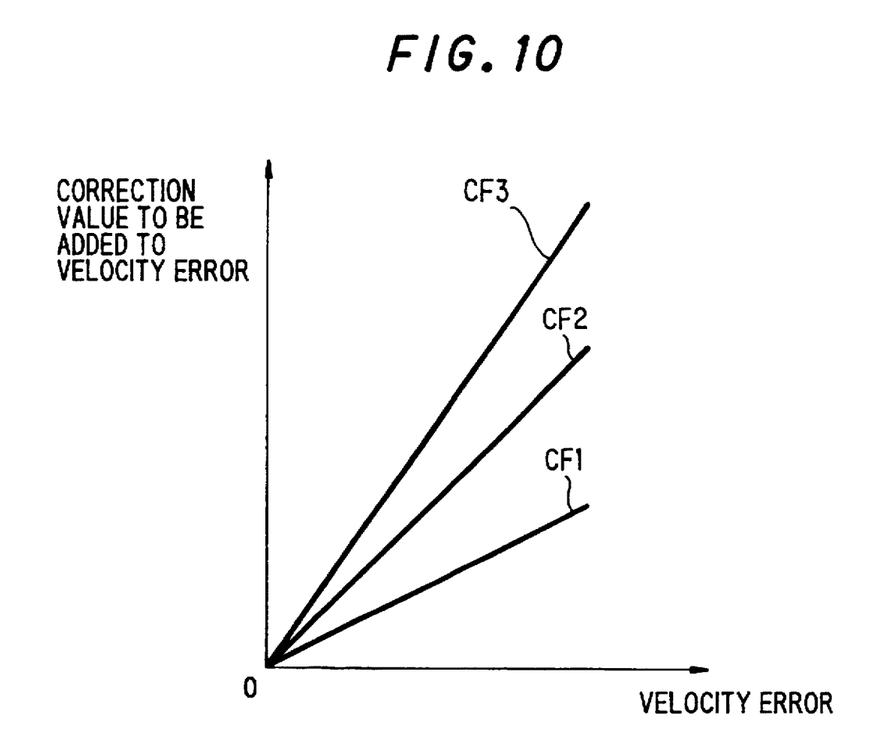
Figure 11:
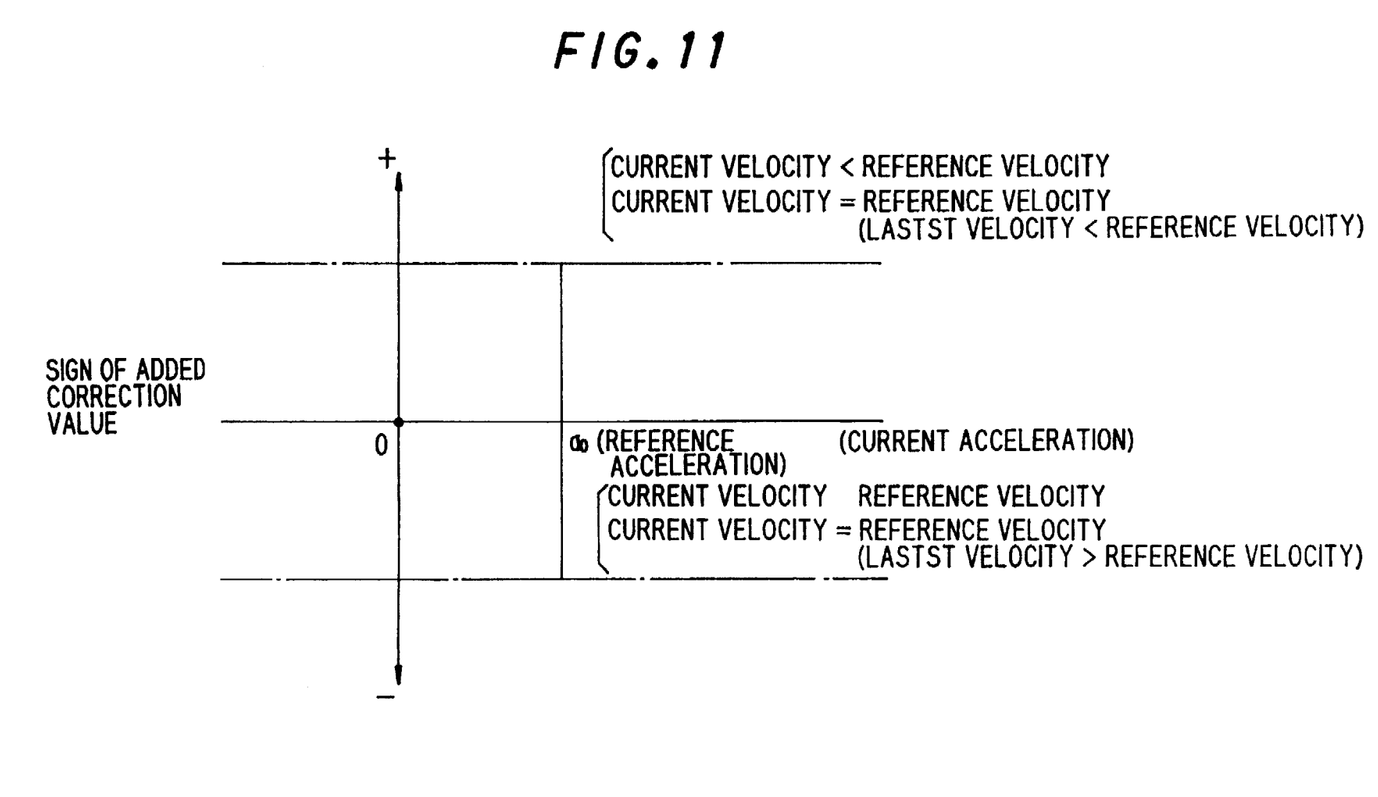
Figure 12:
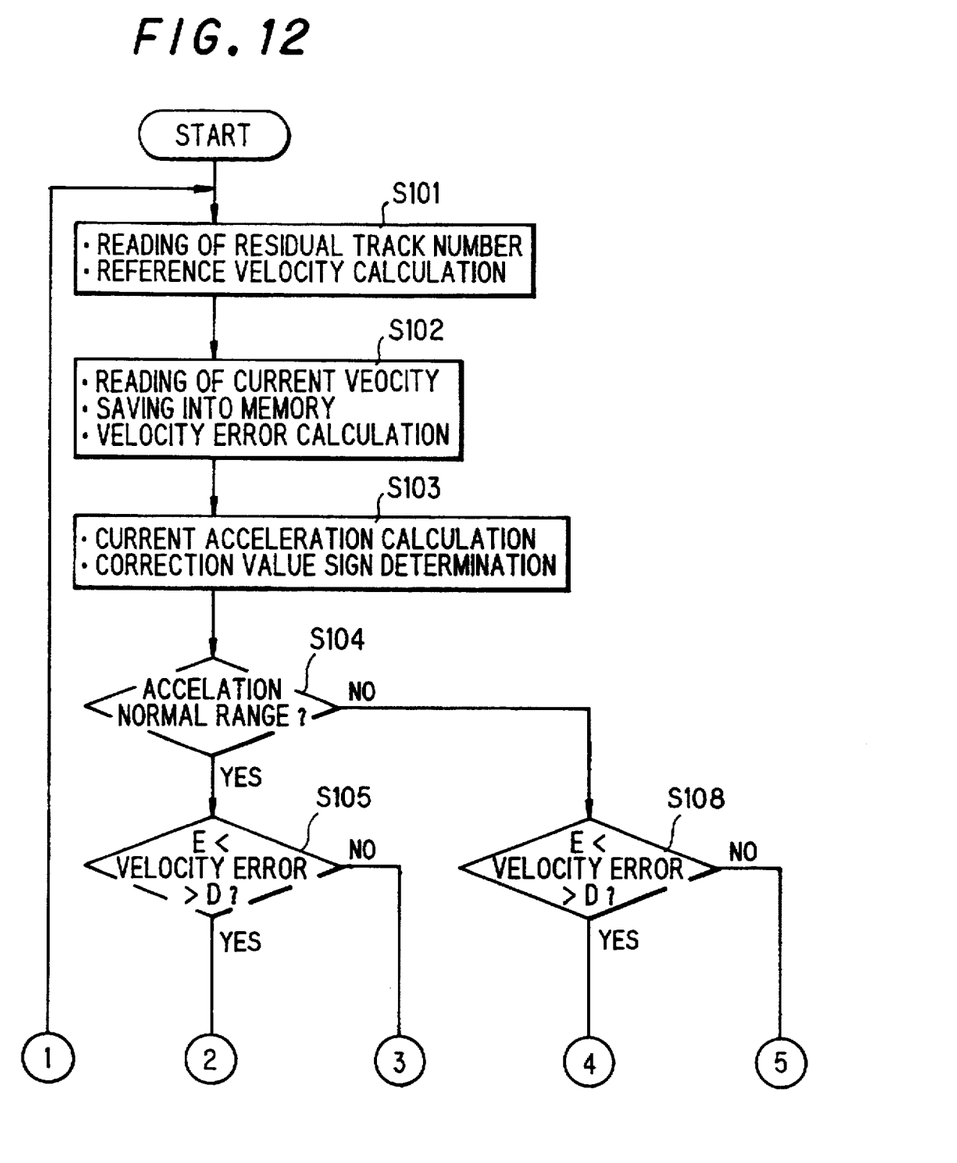
Figure 13:
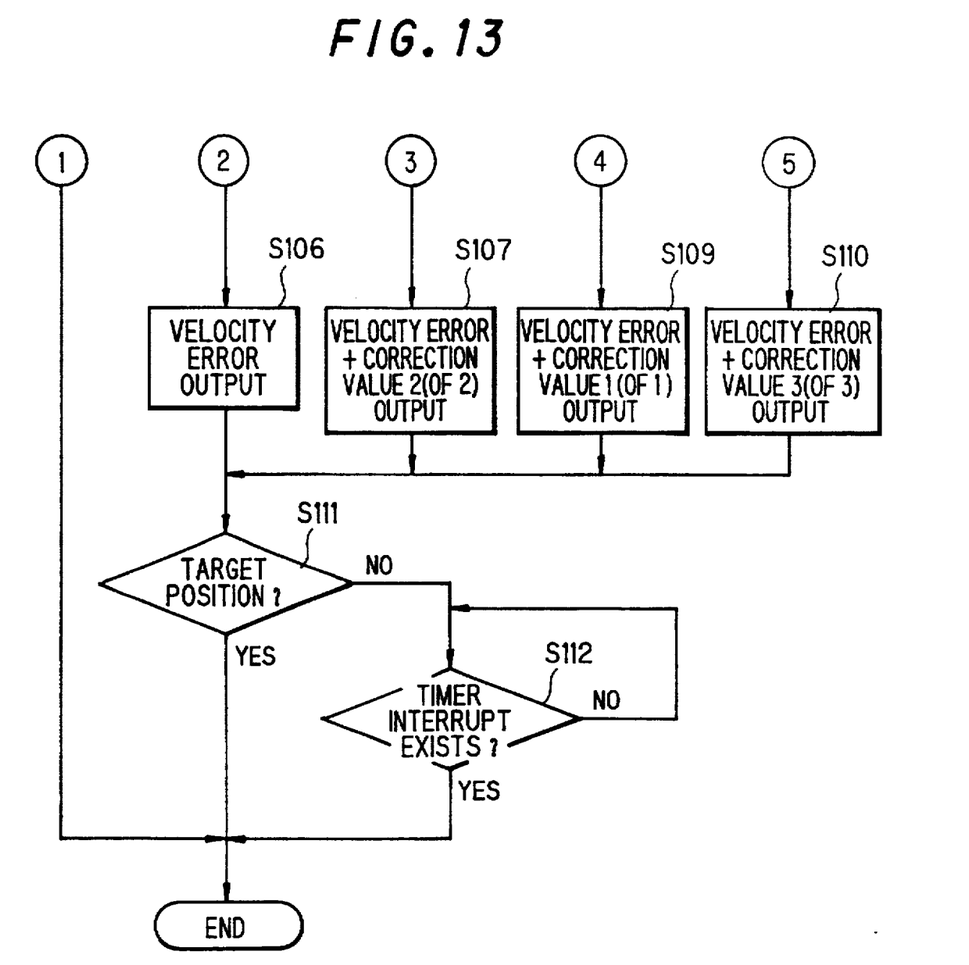

Next, the operation of the access control system in the embodiment will be explained referring to FIGS. 8 to 13, where FIG. 9 is a diagram for explaining an example of the velocity control in the embodiment, FIG. 10 is a diagram for explaining the relation between the velocity error and the correction value to be added to the velocity error, FIG. 11 is an illustration for explaining the relation between a current acceleration and a sign of the added correction value, and FIGS. 12 and 13 are flow charts for explaining the velocity control operation of the control circuit 11 during the deceleration motion.

In FIG. 9, a one-dotted chain line A indicates the locus of reference velocity, which is stored as a table which includes reference velocity values corresponding to the number of residual tracks from a current position to the target position in the control circuit 11. A full line B indicates the locus of a value obtained by subtracting the correction value to be added from the reference velocity, a dotted line C indicates the locus of the actual velocity change of the optical pickup 2. Also, two-dotted chain lines D and E indicate the locus of the scope of velocity error in the case(ordinary velocity control case) of completing the movement up to the target position by using only the velocity error and adding no correction value.

When the current velocity of the optical pickup 2 is greater than the locus D(two-dotted chain line) or less than the locus E(two-dotted chain line), the correction value to be added to the velocity error is changed to a greater one(OF2 or OF3 in FIG. 10).

When it is greater than the locus E and less than the locus D, the velocity control with a standard correction value(OF1 in FIG. 4) or with no correction value is conducted. The values of the loci D and E are set to be optimum for the device to be used.

In FIG. 9, $t_1$ to $t_{21}$ indicate time points equally sectioned by a predetermined time period Ta. The velocity values at $t_n$ of the respective loci are represented by $A_m$ to $E_m$. $B_{r1}$ to $B_{r10}$, $B_{r12}$, $B_{r13}$ and $B_{r21}$ are the same values as the locus A.

Meanwhile, Ta is a unit time that the control circuit 11 reads the current velocity from the optical pickup velocity calculation circuit 10 and outputs the velocity control signal. In FIG. 9, to facilitate the understanding, the proportion of Ta to the velocity locus is exaggeratedly modified.

After the access is started, the optical pickup 2 is accelerated through the velocity control signal to which Vmax set as a value of $A_{r1}$ $(=B_{r1})$ is D/A converted(locus C). When the velocity on the locus C reaches Vmax at $t_2$, the constant velocity control is started.

Then, at $t_{10}$, the deceleration control operation, where the controls shown by the flow charts in FIGS. 12 and 13 are conducted, is started. First, at step S101, the number of residual tracks up to the target position which is counted based on the number of tracks from the current position to the target position which was given to the residual track number counter circuit 9 before accessing is read, and the reference velocity is determined by referring to the reference velocity locus table based on the number of residual tracks.

Then, at step S102, the current velocity of the optical pickup 2 is read and stored in the memory for the next acceleration calculation. Also, the absolute value $|C_m-A_m|$ of the difference of the current velocity(on locus C) and the reference velocity(on locus A) is calculated to give the velocity error.

At step S103, from the difference of the latest velocity and the current velocity, the current acceleration($C_{m-1}-C_m$) is calculated. Also, from the relation between the current acceleration and the reference acceleration as shown in FIG. 11, the sign of the correction value to be added to the velocity error is determined. Meanwhile, the reading of the current velocity is administrated by a timer, and the current velocity is read at intervals of the predetermined time period Ta(step S112).

At step S104, if the current acceleration calculated at step 103 is out of a predetermined range, which depends on the characteristics of the mechanical parts, step S108 is conducted, or, if it falls within the predetermined range, step S105 is conducted.

At step S105, if $(A_m-E_m)\leq$ velocity error $\leq (D_m-A_m)$ is satisfied, the velocity error is D/A converted and output(step S106). In case of velocity error$<(A_m-E_m)$ or velocity error $>(D_m-A_m)$, the value obtained by adding the correction value(OF2 in FIG. 10) whose sign ± is determined as shown in FIG. 11 to the velocity error is D/A converted and output(step S107).

At step S108, if the relation of '$(A_m-E_m)\geq$ velocity error $\geq (D_m-A_m)$' is obtained, the value obtained by adding the correction value(OF1 in FIG. 10) whose sign ± is determined as shown in FIG. 11 to the velocity error is D/A converted and output(step S109). In case of velocity error$<(A_m-E_m)$ or velocity error$>(D_m-A_m)$, the value obtained by adding the correction value(OF3 in FIG. 10) whose sign ± is determined as shown in FIG. 11 to the velocity error is D/A converted and output(step S110).

At step 111, the number of residual tracks up to the target position is read from the residual track number counter circuit 9, and then, if it is zero, the operation is completed, or, if not so, then waiting the next timer interrupt. When the interrupt after the predetermined time period Ta is made, the operation is restarted from step S101.

As explained above, in this embodiment, the correction value is changed depending upon circumstances in the deceleration control operation as described. Therefore, even when a dispersion or a variation with time in the mechanical parts occurs, the stable and high-speed access operation can be performed.

Furthermore, the operation of the access control system in this embodiment will be detailed below.

When an acceleration during the deceleration motion is a[m/s$^2$], the number of residual tracks up to the target track position is n, the distance up to the target track position is x[m] and the track pitch is tp[m], the reference velocity vt[m/s] is given by:

$$vt=(2ax)^{1/2} \qquad (F1)$$

On the other hand, the reference velocity $A_m$ by the number of passing track pulses when the sampling frequency is fs[Hz] is represented by:

$$A_m=(1/fs)/(tp/vt) \qquad (F2)$$

Based on formulas F1 and F2, the table of reference velocity($A_m$) locus to the number(n) of residual tracks is made. This table is previously developed in the program for operating the control circuit 11.

The current velocity $C_m$ is represented by using the number of the passing track pulses when the sampling frequency is fs[Hz]. The control circuit 11 reads the current velocity $C_m$ at intervals of the period Ta from the optical pickup velocity calculation circuit 10. The variation of the reference velocity to each cycle Ta is set as the reference acceleration $a_0$, where the direction of deceleration is positive. The current acceleration is calculated from the difference between the latest velocity and the current velocity. Namely, in the case that the direction of deceleration is positive, it is calculated from $|C_{m-1}-C_m|$.

For example, when an acceleration in the deceleration motion is 13[m/s$^2$], a track pitch is 1.6[μm] and (the reciprocal of a current velocity detection sampling frequency)=(a current-velocity reading cycle) Ta=1[ms], a velocity of 0.3[m/s] corresponds to (BC)h and the reference acceleration $a_0$=(8)h is obtained. Therefore, the predetermined range of acceleration is (4)h to (10)h when it is set to be ½ times to two times $a_0$.

In this case, as an example of setting, '(locus D)=(reference velocity)+(A)h' and '(locus E)=(reference velocity)−(A)h' are available.

For the correction value, a value proportional to the velocity error, OF3×=α*(velocity error), is desirable. As an example of setting, OF1=0.5*(velocity error), OF2=1*(velocity error) and OF3=1.5*(velocity error) are available.

Referring to FIG. 9, at $t_{11}$ and $t_{14}$, the sign of the correction value is determined positive based on FIG. 11 since the current acceleration, which is less than ½ times $a_0$, exceeds the predetermined range, i.e., greater than ½ times the reference acceleration $a_0$ and less than two times that and the relation of (current velocity)>(reference velocity) is obtained.

Further, since the relation of '$(A_m-E_m) \leq$(velocity error)$\leq (D_m-A_m)$' is obtained, the value obtained by adding the correction value(OF1 in FIG. 10) to the velocity error is D/A converted and output(step S109).

Also, at $t_{12}$, $t_{19}$ and $t_{18}$ to $t_{21}$ in FIG. 9, the sign of the correction value is determined positive based on FIG. 11 since the current acceleration falls within the predetermined range and the relation of '(current velocity)>(reference velocity)' is obtained. Further, since the relation of '$(A_m-E_m) \leq$(velocity error)$\leq (D_m-A_m)$' is obtained, the correction value is not added and only the velocity error is D/A converted and output(step S106).

At $t_{15}$, the sign of the correction value is determined positive based on FIG. 11 since the current acceleration, which is less than ½ times $a_0$, exceeds the predetermined range and the relation of (current velocity)>(reference velocity) is obtained. Further, since the relation of '(velocity error)>$(D_m-A_m)$' is obtained, the value obtained by adding the correction value(OF3 in FIG. 10) to the velocity error is D/A converted and output(step S110).

At $t_{16}$, the sign of the correction value is determined positive based on FIG. 11 since the current acceleration falls within the predetermined range and the relation of (current velocity)>(reference velocity) is obtained. Further, since the relation of '(velocity error)>$(D_m-A_m)$' is obtained, the value obtained by adding the correction value(OF2 in FIG. 10) to the velocity error is D/A converted and output(step S107).

At $t_{17}$, the sign of the correction value is determined negative based on FIG. 11 since the current acceleration, which is greater than 2 times $a_0$, exceeds the predetermined range and the relation of (current velocity)>(reference velocity) is obtained. Further, since the relation of '$(A_m-E_m) \leq$(velocity error)$\leq (D_m-A_m)$' is obtained, the value obtained by adding the correction value(OF1 in FIG. 10) to the velocity error is D/A converted and output(step S109).

When the acceleration is high, only with the control system judging from velocity error, the velocity at $t_{18}$ may be much less than the reference velocity since a further deceleration may be conducted by the relation of (current velocity)>(reference velocity). However, the velocity error for deceleration can be effectively suppressed since the acceleration is also judged. When 'OF1=(velocity error)' is set, the velocity error can be zero.

The various techniques mentioned above can be made effective by adding the aforementioned functions(operation control means) to the control circuit etc.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An access control system for an optical disk device, comprising:

a residual track number counter circuit which counts the number of residual tracks from a current position of an optical pickup to a target position;

an optical pickup velocity calculation circuit which calculates a current velocity of said optical pickup at intervals of a predetermined time period; and a control circuit which comprises a reference velocity calculation means which a reference velocity from said number of residual tracks to be counted by said residual track number counter circuit, a velocity error calculation means which calculates a velocity error between said reference velocity and said current velocity, a current acceleration calculation means which calculates a current acceleration based on a variation of said current velocity and an acceleration error calculation means which calculates an acceleration error between said current acceleration and a predetermined reference acceleration;

wherein said control circuit further comprises a control means which moves said optical pickup to said target position while controlling the velocity of said optical pickup by using said velocity error or using a value obtained by adding a correction value determined by said velocity error, said current acceleration and said acceleration error to said velocity error as a driving signal of said optical pickup.

2. An access control system, according to claim 1, wherein:

said control means comprises a function of renewing said correction value at intervals of a predetermined time period.

3. An access control system, according to claim 2, wherein:

said control means controls the velocity of said optical pickup by using said velocity error when said current acceleration falls within a normal range and said velocity error falls within a predetermined range, or using said value obtained by adding said correction value to said velocity error when said current acceleration falls outside said normal range or when said current acceleration falls within said normal range and said velocity error falls outside said predetermined range, while adding a positive or negative sign to said correction value depending on a difference between said current acceleration and said reference acceleration.

4. An access control system, according to claim 1, wherein:

said control means controls the velocity of said optical pickup by using said velocity error when said current acceleration falls within a normal range and said velocity error falls within a predetermined range, or using said value obtained by adding said correction value to said velocity error when said current acceleration falls outside said normal range or when said current acceleration falls within said normal range and said velocity error falls outside said predetermined range, while adding a positive or negative sign to said correction value depending on a difference between said current acceleration and said reference acceleration.

* * * * *

UNITED STATES PATENT AND TRADEMARK OFFICE
CERTIFICATE OF CORRECTION

PATENT NO. : 5,802,019
DATED : September 1, 1998
INVENTOR(S) : Minoru YAMADA

It is certified that error appears in the above-identified patent and that said Letters Patent is hereby corrected as shown below:

Column 3, line 35, delete "in FIG. 6" and insert --in FIG. 8--.

Column 5, line 33, delete "$B_{113}$ and $B_{121}$" and insert --$B_{113}$ and $B_{118}$ to $B_{121}$--.

Column 7, line 23, delete "$t_{19}$" and insert --$t_{13}$--.

Signed and Sealed this

Thirteenth Day of July, 1999

Q. TODD DICKINSON

Attest:

Attesting Officer

Acting Commissioner of Patents and Trademarks